Dec. 2, 1969 T. J. SLONE 3,481,709
AUTOMATIC ANALYTICAL SYSTEM
Filed Dec. 27, 1966 4 Sheets-Sheet 3

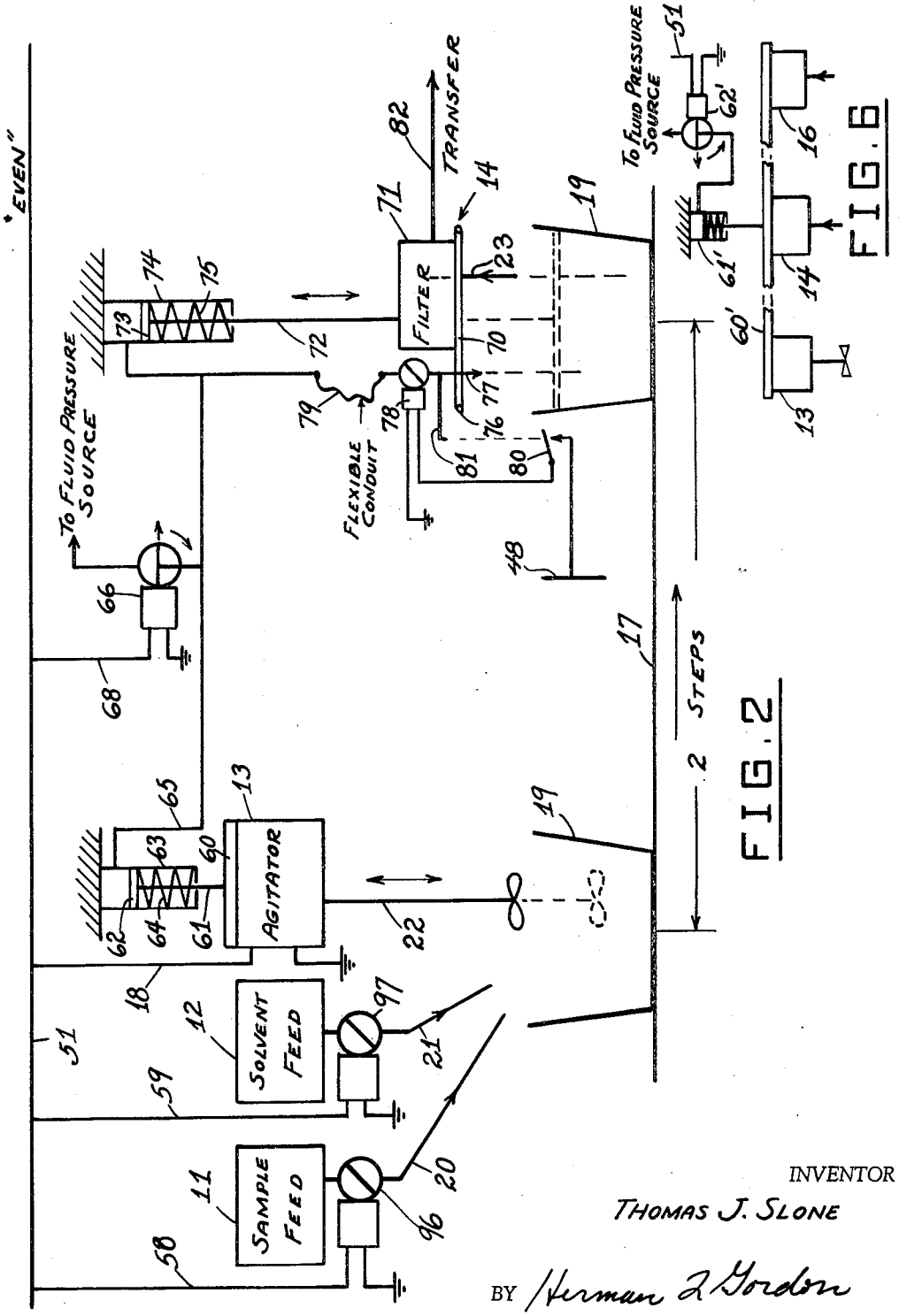

INVENTOR
THOMAS J. SLONE
BY Herman L. Gordon
ATTORNEY

United States Patent Office 3,481,709
Patented Dec. 2, 1969

3,481,709
AUTOMATIC ANALYTICAL SYSTEM
Thomas J. Slone, Silver Spring, Md., assignors to American Instrument Co., Inc., Silver Spring, Md.
Filed Dec. 27, 1966, Ser. No. 605,040
Int. Cl. B01l 3/00
U.S. Cl. 23—253
9 Claims

ABSTRACT OF THE DISCLOSURE

Endless conveyor belt analytical apparatus for carrying out chemical analysis in a step-by-step automated sequence, having a first station delivering sample material and solvent to a container on a first step-actuated belt, an agitator to mix the sample and solvent, a transfer pump and filtering arrangement at a second station extracting the mixed solution and delivering same to a container on a second step-actuated conveyor belt, a sampling-dilution and readout extraction station adjacent the second belt to extract a sample of the filtered solution, deliver it to a succeeding clean container on the second belt, dilute the solution sample, and extract the diluted solution sample and deliver it to a spectrophotometric readout device, washers under the belts to cleanse the inverted containers of the belts, and dryers acting on the cleansed inverted containers as the belts move, to return clean dry containers to the sample-solvent-supplying first station, with respect to the first belt, and to the station at which the mixed solution is delivered, with respect to the second belt.

---

This invention relates to improvements in apparatus for automatically conducting analytical procedures, and more particularly to an apparatus capable of carrying out a procedure wherein a sample is subjected to a succession of treatments, such as dilution, agitation, filtration, and the like, and is subsequently delivered to a readout device for evaluation.

A main object of the invention is to provide a novel and improved automated apparatus for conducting analytical procedures or procedural steps, said apparatus involving relatively simple components, being reliable in operation, and providing a high degree of uniformity in subjecting successive samples to the succession of procedural steps performed thereby, thus assuring accuracy as well as economy in operation.

A further object of the invention is to provide an improved automated apparatus for processing a sample undergoing chemical analysis, said apparatus being capable of carrying out automatically substantially the same procedures heretofore accomplished by laboratory technicians, but with a much higher degree of precision and uniformity, the apparatus involving relatively inexpensive parts, being easy to adjust, and being easy to maintain in proper working condition.

A still further object of the invention is to provide an improved automated apparatus for performing steps in an analytical procedure, such as supplying a sample, diluting the sample with a precisely known amount of solvent, agitating the sample and solvent, filtering the resulting solution, extracting a precisely known quantity of the filtered solution, adding a precisely known quantity of additional solvent to the extracted quantity of solution, and delivering the resultant diluted solution to a readout device for evaluation, these steps being performed in a regular sequence which is continuously repeated with successive definite amounts of the sample with precise controlled regularity, and without requiring any human supervision, the containers for the samples and subsequent dilutions thereof being used over and over again in a regular cycle, said containers being emptied, washed, and dried automatically during the cycle so that a clean dry container is always presented for receiving a sample.

Further objects and advantages of the invention will become apparent from the following description and claims, and from the accompanying drawings, wherein:

FIGURE 2 is a schematic diagram of the sample feed-solvent feed-agitator station and the transfer pump and filter station of the apparatus of FIGURE 1.

FIGURE 3 is a schematic diagram of the sampling-dilution-read-out extraction station of the apparatus of FIGURE 1.

FIGURE 5 is a fragmentary portion of the electrical circuit of FIGURE 4, but showing a modification.

FIGURE 6 is a fragmentary diagrammatic view showing a further possible modification of the invention.

Figure 1:
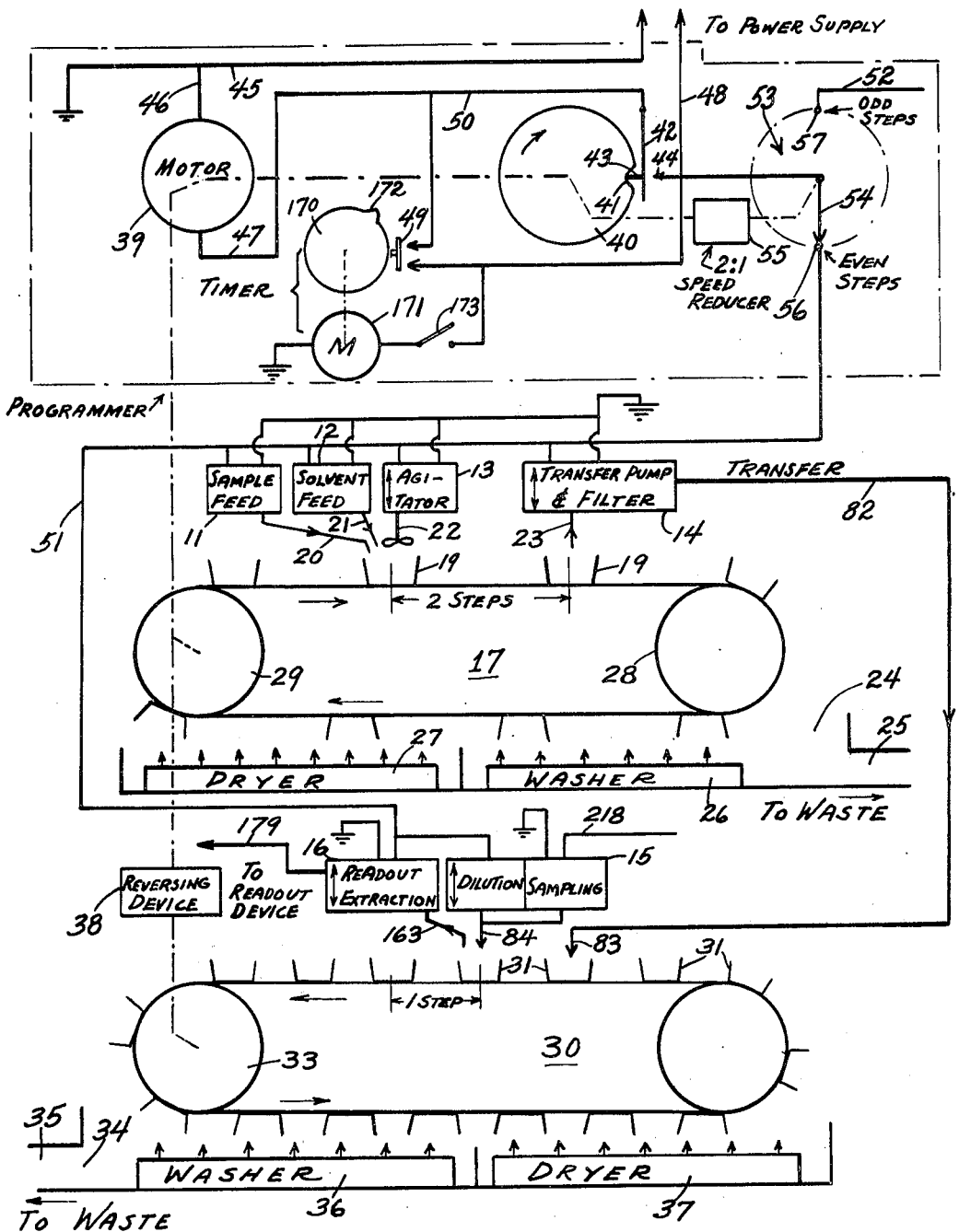
FIGURE 1 is a schematic diagram of an improved automated apparatus constructed in accordance with the present invention, showing the control circuitry for the main conveyor motor and showing an associated cyclic pulse-forming device.

Referring to the drawings, FIGURE 1 shows in schematic form a typical automatic analyzing apparatus according to the present invention, the apparatus being adapted to receive a definite-quantity sample of material to be analyzed, for example, a capsule or the like, from a sample-feeding source 11, and after suitable processing, including dissolving the sample in a definite quantity of solvent from a solvent-feeding source 12, agitating the sample in the solvent by means of an agitator 13, passing the solution through a filter associated with a transfer-filter stage 14, taking a definite quantity of the filtered solution and re-diluting same by means of a sampling and dilution apparatus 15 with a definite further quantity of a solvent, and finally extracting the resultant solution and feeding it to a suitable readout device by means of a readout extraction apparatus 16. The readout device may be of any suitable type, such as a spectrophotometric apparatus, a thermometric apparatus, a conductivity apparatus, or the like, which can provide a quantitative readout.

The system shown in FIGURE 1 is particularly applicable for analyzing capsules containing specific substances, for inspection purposes, to ascertain the percentage content of such substances in the capsules, but may be readily modified as required, for analyzing other materials from which samples can be readily obtained. For example, the system may employ only one stage of reagent insertion, as where the sample must be treated with only a single reagent.

In the typical system shown in FIGURE 1, 17 designates a first belt conveyor whose top run is located subjacent the suitably supported sample feed device 11, solvent feed device 12, agitator 13, and the transfer device 14.

The conveyor belt 17 is provided with uniformly spaced, longitudinally aligned containers 19. The sample feed device 11 has a depending outlet conduit 20, the solvent feed device has a depending outlet conduit 21, the agitator 13 has a depending agitating element 22, and the transfer device 14 has a depending intake conduit 23, the lower ends of the depending elements 20, 21 and 22 being located adjacent to each other so as to be operatively positioned over a common container 19 on the top run of belt 17, and the intake conduit 23 being located over the next forwardly adjacent container 19 on the belt, as shown in FIGURE 1. The top run of said belt moves toward the right, as viewed in FIGURE 1, namely, the belt moves in a clockwise direction.

Beneath the right end of the belt conveyor 17 is a receptacle 24 leading to a waste conduit 25, for disposing of the remaining contents of containers 19 passing around the right roller 28 of the belt. Adjacent receptacle 24 beneath the bottom run of the belt is a container-washing apparatus 26 adapted to project jets or sprays of washing liquid against the inverted emptied containers 19 located thereover, to thoroughly cleanse same. Beneath the left portion of the bottom run of the conveyor belt, adjacent the washer 26 is a container-drying apparatus 27, adapted to dry the cleansed containers, for example, by means of radiant heat, hot air jets, or a combination thereof.

After drying, the cleansed containers move with the belt around the left roller 29 toward positions where they will be ultimately again located beneath the stations 11, 12, 13 and 14, in a manner presently to be described.

Arranged adjacent to the belt conveyor 17, for example in side-by-side relation thereto, is a second belt conveyor 30 generally similar to belt conveyor 17 and having uniformly spaced, longitudinally aligned containers 31 mounted thereon. The belt conveyor 30 moves in a direction opposite to that of belt conveyor 17, namely, in a counterclockwise direction, as viewed in FIGURE 1, so as to conserve space because of the side-by-side arrangement of the belt conveyors.

After the containers 31 pass around the left end roller 33 of belt conveyor 30, the contents of the containers empty into a receptacle 34 leading to a waste conduit 35. Subsequently, the inverted containers are washed by a washing apparatus 36, similar to the washer 26, and are eventually dried by a drying apparatus 37, similar to the drying apparatus 27.

The drive rollers 29 and 33 are coupled together through a suitable reversing mechanism 38, such as a conventional differential mechanism, and are driven simultaneously by a common drive motor 39 provided with step-wise energizing means, so that the belt conveyors are driven in discrete steps. In the typical embodiment illustrated in FIGURE 1, each step corresponds to the spacing between the containers 31 on belt 30. The spacing between the containers 19 is twice that of containers 31 and the reversing mechanism 38 has a 1:1 ratio, so that one cycle of energization of motor 39 will advance the containers on the belt conveyors through a distance corresponding to one step, for example, the distance between two adjacent containers 31, 31.

The cycle of energization of motor 39 is determined by a cam 40 driven by the motor, said cam having a peripheral notch 41. A spring contact arm 42 is mounted adjacent the cam periphery and has a follower lug 43 normally engaging in said notch, which allows arm 42 to disengage from a stationary contact 44. Cam 40 rotates clockwise, as viewed in FIGURE 1, and as soon as it starts to rotate, arm 42 is cammed into engagement with contact 44.

One terminal wire 46 of motor 39 is connected to a grounded power supply conductor 45. The other motor terminal wire 47 is connected to the remaining power supply conductor through a normally open push button switch 49. Wire 47 is also connected by a wire 50 to switch arm 42. Since contact 44 and switch arm 42 are in shunt with switch 49, the motor 39 will remain energized for one cycle of rotation of cam 40 after switch 49 is momentarily closed.

Thus, the conveyors 17 and 30 may be advanced through one step, as above described, by momentarily closing switch 49. The motor will become deenergized at the end of said step by the opening of contacts 42–44.

The triggering switch 49 is periodicaly momentarily closed by a timed cam 170 driven by a timing or programming motor 171, the cam 170 having a projection 172 engageable with the push button of switch 49 once during each timed revolution of cam 170. As shown, one terminal of timing motor 171 is grounded and the other terminal thereof is connected to power supply conductor 48 through a master control switch 173.

As shown in FIGURE 1, a means is provided for alternately connecting a pair of conductors 51 and 52 to line wire 48 responsive to the successive cycles of rotation of cam 40. Said means comprises a rotary switch 53 having a switch pole 54 drivingly coupled to cam 40 through a 2:1 speed reduction unit 55, whereby pole 54 rotates through half a revolution with each complete revolution of cam 40. Poe 54 is engageabe wtih aternate stationary contacts 56 and 57 in the respective positions of rest of switch poe 54. Conductor 51 is connected to stationary contact 56 and conductor 52 is connected to stationary contact 57.

As the cam 40 reaches the end of its cycle of rotation, as above mentioned, a pair of successive containers 19 will be respectively located beneath the discharge conduits 20, 21 and agitator element 22 and beneath the intake conduit 23 of the transfer device 14, as shown in FIGURE 2. The discharge conduits 20 and 21 are provided with respective solenoid valve or gate devices 96 and 97, each having one terminal of its operating winding grounded. The remaining terminals of said operating windings are connected by wires 58 and 59 to the conductor 51, so that when conductor 51 becomes energized by the closure of contacts 54–56, devices 96 and 97 become energized and respectively allow a measured quantity or capsule of sample material to discharge from the reservoir 11 and a measured quantity of solvent to discharge from the reservoir 12, so as to be delivered to the subjacent container 19.

The electricaly operated agitator device 13 has one terminal of its actuating circuit grounded and the other terminal connected by a wire 18 to conductor 51. The agitator device is secured to a supporting plate member 60 which is rigidly secured to the depending piston rod 61 of a piston 62 contained in a vertical fluid pressure cylinder 63. The piston 62 is normally supported in an elevated position by a coiled spring 64 surrounding the piston rod in the lower portion of cylinder 63 and bearing between the piston 62 and the bottom end of the cylinder. The upper portion of cylinder 63 is connected by a conduit 65 and a normally vented three-way solenoid valve 66 to a suitable fluid pressure source. One terminal of the operating winding of valve 66 is grounded. The other terminal thereof is connected by a wire 68 to the conductor 51.

The transfer device 14 comprises a horizontal closure plate 70 on which is mounted a filter unit 71. The assembly 70–71 is rigidly secured to the depending piston rod 72 of a piston 73 contained in a stationary depending cylinder 74 similar to cylinder 63. A coiled spring 75 surrounds piston rod 72 in cylinder 74, bearing between piston 73 and the bottom wall of cylinder 74, biasing the liquid transfer assembly 70–71 toward a normally elevated position providing clearance for movement of the containers 19 beneath the intake conduit 23. The upper portion of cylinder 74 is connected to the conduit 65, whereby to cause piston 73 to descend when valve 66 is energized.

The plate 70 is shaped to fit in the upper portion of a a sealing element 76 adapted to make sealing contact with subjacent container 19 and its periphery is provided with the inside surface of the upwardly flaring subjacent container 19 when the assembly 70–71 is lowered to the dotted view position thereof shown in FIGURE 2, responsive to the energization of valve 66, as above described.

A fluid admission conduit 77 is rigidly secured in and extends through plate 70, being connected to the conduit 65 through a normally closed solenoid valve 78 and a flexible conduit 79. One terminal of the operating winding of valve 78 is grounded. The other terminal of said operating winding is connected to line wire 48 through a normally open limit switch 80 whose actuating element is located so as to be engaged by an arm 81 rigidly secured to conduit 77, responsive to the descent of plate 70 to its sealing position in the subjacent container 19 shown in dotted view in FIGURE 1. The closure of switch 80 energizes valve 78 and admits pressure fluid (compressed air or gas) from the fluid pressure source into the top portion of the container 19, causing the pressurized liquid therein to be forced through the inlet conduit 23 and filter device 71 to the transfer conduit, shown at 81, leading to the second belt conveyor 30.

Filter device 71 may be mounted on the plate 70, as described, or alternatively, may be located at any desired point along the transfer conduit 82.

Conduit 82 leads to a discharge tube 83 located above a container 31 near the right end of belt conveyor 30. The sampling and dilution assembly 15 has its intake-discharge conduit 84 located above a container 31 spaced one conveyor step to the left of the filter discharge tube 83, as viewed in FIGURE 1.

As shown in FIGURE 3, the sampling and dilution device 15 is secured to and depends from a plate 85. A vertical piston rod 86 depending from a piston 87 is rigidly secured to plate 85, the piston 87 being slidably and sealingly contained in a stationary vertical fluid pressure cylinder 88. Piston 87 is biased upwardly by a coiled spring 90 in the lower portion of cylinder 88 surrounding piston rod 86 and bearing between piston 87 and the bottom wall of the cylinder. The top portion of the cylinder is connected through a conduit 91 and a normally vented electromagnetic three-way valve 92 to a suitable fluid pressure source. Spring 90 normally supports plate 85 at a sufficient height to provide ample clearance between intake-discharge conduit 84 and the containers 31 on conveyor 30 to allow the containers to move therepast. When valve 92 becomes energized, fluid under pressure is admitted into the top portion of cylinder 88, forcing piston 87 down and lowering plate 85 so that conduit 84 will be immersed in the contents of a subjacent container 31.

One terminal of the operating winding of the solenoid valve 92 is grounded. The other terminal thereof is connected to a wire 152.

The readout extraction device 16 may comprise a suitable electrically operated suction pump, or any other suitable electrically operated burette device, the device 16 being secured to a plate 93 which is in turn rigidly secured to the depending piston rod 94 of a piston 95 contained in a stationary depending vertical cylinder 98. Piston 95 is biased upwardly by a coiled spring 99 surrounding the piston rod 94 in the lower portion of cylinder 98 and bearing between piston 95 and the bottom wall of cylinder 98. The readout extraction device 16 has an intake conduit 163 located adjacent the intake-discharge conduit 84 of the sampling and dilution device 15 and being positioned over the same subjacent container 31. Spring 99 acts in the same manner as spring 90 to normally maintained its associated conduit 163 at a non-interfering height relative to the containers 31.

The top portion of cylinder 98 is connected through a conduit 100 and a normally vented three-way solenoid valve 101 to the fluid pressure source. One terminal of the operating winding of valve 101 is grounded. The other terminal of said winding is connected to the wire 51.

Figure 4:
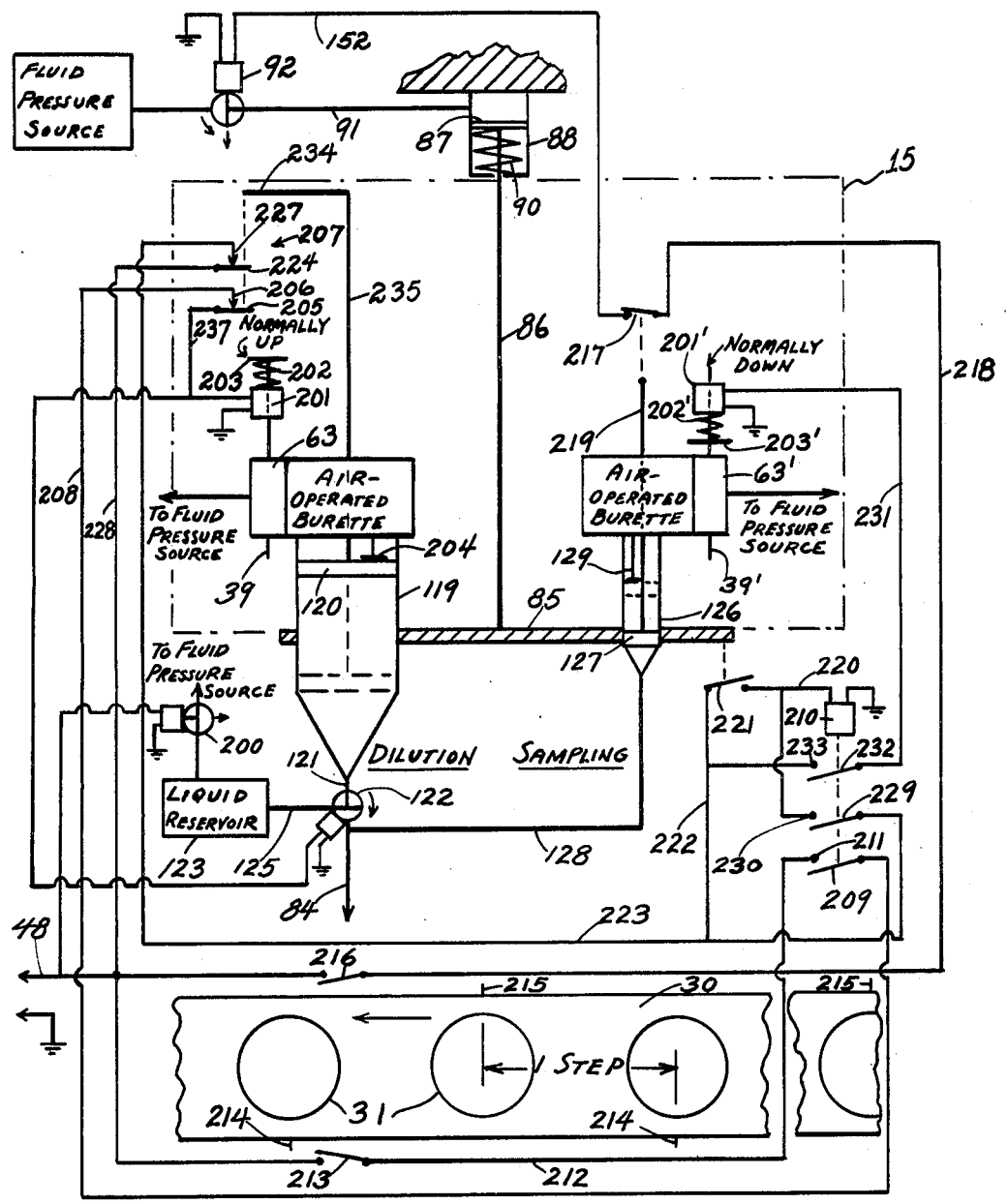
FIGURE 4 is a more detailed schematic diagram of the sampling and dilution device of FIGURE 3.

Referring to FIGURE 4, the sampling and dilution device 15 comprises a first air-operated burette 119 provided with a piston 120 in its barrel and provided at its bottom end with an outlet conduit 121 including a three-way valve 122 leading to the depending vertical intake-discharge conduit 84. A solvent supply reservoir 123 is connected by a conduit 125 to the side connection of valve 122, as viewed in FIGURE 4. Valve 122 is shown in its normal position, namely, wherein conduit 125 is placed in communication with conduit 121 and the lower end of burette 119. A suitable fluid (air or gas) pressure source is connected to reservoir 123 through a valve 200 energized from line wire 48 so as to continuously pressurize the reservoir 123 when the apparatus is in normal operation as shown in FIGURE 4, whereby to force the liquid of reservoir 123 with positive pressure through valve 122 into burette 119. Valve 200 disconnects reservoir 123 from the fluid pressure source and vents said reservoir to atmosphere when line 48 is deenergized.

Designated at 126 is a second, relatively smaller air-operated burette provided with a piston 127 and provided at its bottom end with an outlet conduit 128 connected to the upper portion of intake-discharge conduit 84, so that there is a substantial length of conduit depending below the joint between conduits 128 and 84. The internal volume of this depending length of conduit is substantially equal to the increment of volume in the space in the barrel of burette 126 below piston 127 obtained when the piston moves upwardly from its normal lowermost position to a position engaging an adjustable stop 129 provided in the top end of the burette 126, with the stop 129 set to its uppermost position. In other words, assuming valve 122 to be in the position shown in FIGURE 4, when piston 127 is moved upwardly from its illustrated lowermost position to a position engaging stop 129, it can draw a volume of solution into conduit 84 sufficient to fill same almost up to the joint between conduits 84 and 128, but in such a manner as to prevent the picked-up solution from entering line 128.

The burettes 119 and 126 are of the conventional air-operated type similar to that disclosed in U.S. Patent No. 3,180,527 to J. C. Wasilewski et al. The burette 119 is provided with the control valve 63 having an operating plunger 39 and the burette 126 is provided with the control valve 63' having the operating plunger 39'. Plunger 39 is operated by a solenoid 201, the plunger extending through the solenoid and being biased upwardly by a coiled spring 202 surrounding the top portion of the plunger and bearing between a top head member 203 on the plunger and the top of solenoid 201. With plunger rod 39 in its upper position, shown in FIGURE 4, valve 63 is conditioned to hold piston 120 in its elevated position, engaging an adjustable stop 204 provided in the top portion of burette 119. When solenoid 201 becomes energized, rod 39 is pulled downwardly and conditions valve 63 to force piston 120 downwardly to its dotted view position of FIGURE 4. Valve 122 is a solenoid valve whose operating winding is connected in parallel with solenoid 201, so that valve 122 connects conduit 121 to discharge conduit 84 when solenoid 201 depresses rod 39, whereby to allow burette 119 to discharge through conduit 84.

Plunger 39' is operated by a solenoid 201', the plunger extending through the solenoid and being biased downwardly by a coiled spring 202' surrounding the plunger and bearing between a collar 203' secured on the plunger and the bottom of solenoid 201'. With plunger 39' in its depressed position, shown in FIGURE 4, valve 63' is conditioned to hold piston 127 in its depressed position in burette 126. When solenoid 201' becomes energized, rod 39' is pulled upwardly and conditions valve 63' to elevate piston 127 into engagement with stop 129, drawing a measured quantity of liquid into conduit 84 from the liquid in which said conduit 84 is immersed, as will be presently described. Spring 202' biases plunger 39' to its depressed position shown in FIGURE 4, thereby biasing piston 127 to its fully depressed position in burette 126.

One terminal of solenoid 201 is grounded. The other terminal thereof is connected through a wire 237, one pole 205 and contact 206 of a normally closed two-pole limit switch 207 to a wire 208, which is in turn connected to one pole of a relay 210. When relay 210 is energized, pole 209 is engageable with a relay contact 211. Said relay contact 211 is connected through a wire 212 and a normally open limit switch 213 to line wire 48. Limit switch 213 is mounted in a position so that its operating element is engageable by pins 214 projecting from one side edge of belt 30. As shown diagrammatically in FIGURE 4, the pins 214 are spaced apart by distances corresponding to two steps of movement of the belt 30 and are located so that switch 213 will be closed when a container 31 is positioned beneath the conduits 163 and 84.

The opposite side edge of belt 30 is provided with similar outwardly projecting pins 215 also spaced apart by distances corresponding to two steps of movement of belt 30, but staggered relative to the pins 214. The pins 215 are operatively engageable with a normally open limit switch 216 and the switch is located so as to be closed in alternating sequence with respect to the switch 213, namely, when a container 31, one step behind the container which previously accompanied the closure of switch 213, is positioned beneath the conduits 163 and 84.

Wire 152 is connected through a normally closed limit switch 217, a wire 218 and normally open limit switch 216 to line wire 48. The operating element of limit switch 217 is engageable by the top end of the piston rod 219 associated with piston 127 when said piston 127 is elevated into engagement with stop 129. As will be presently explained, closure of switch 216 by a pin 215 energizes valve 92 to cause plate 85 to descend, plate 85 being held in lowered position until piston 127 completes its upward stroke in burette 126, whereby to open switch 217 and cause valve 92 to become deenergized and to vent the upper portion of cylinder 88 to atmosphere.

One terminal of the winding of relay 210 is grounded. The other terminal of said relay winding is connected by a wire 220, a normally open limit switch 221, a wire 222, a wire 223, the second pole 224 and contact 227 of limit switch 207, and a wire 228 to line wire 48. The limit switch 221 is mounted so as to be operated to close position by plate 85 when said plate reaches its fully depressed position. When switch 221 is closed, relay 210 becomes energized by the above-described circuit. Said relay is provided with the holding contacts 229, 230 connected in shunt with limit switch 221, to hold relay 210 energized when plate 85 raises responsive to the deenergization of valve 92.

One terminal of solenoid 201' is grounded. The other terminal of said solenoid is connected to wire 222 by a wire 231 and a further set of relay contacts 232, 233.

The two-pole limit switch 207 is mounted so as to be operated by an arm 234 connected to the top end of the piston rod 235 associated with the piston 120 of the dilution burette 119. Thus, the contacts 205–206 and 224–227 are normally closed, but are opened when piston 120 descends to its lowermost position in burette 119, shown in dotted view in FIGURE 4.

As above mentioned, the readout extraction device 16 comprises a conventional electrically operated pump device. The energizing means of said pump device has one terminal grounded and its other terminal connected by a wire 238, a normally open limit switch 239 and a wire 240 to the line wire 48. Limit switch 239 is mounted so as to be operatively engaged by an arm 241 on plate 93 responsive to the descent of said plate and device 16 to the dotted view extraction position of FIGURE 3. Thus, the device 16 becomes energized responsive to said descent because of the closure of switch 239.

It will be noted that the control system employed herein utilizes binary-related signals, namely, a succession of "even" and "odd" signals, each occurring at the end of one step of movement of the belt conveyors 17 and 30. Thus, an "even" binary signal is applied to wire 51 when pole 54 engages contact 56 and a corresponding "even" binary signal is simultaneously applied to wire 212, because the closure of switch 213 occurs substantially simultaneously with the engagement of pole 54 with contact 56. Similarly, an "odd" binary signal is applied to wires 52 and 218 responsive respectively to the engagement of pole 54 with contact 57 and the closure of switch 216.

Obviously, limit switches 216 and 213 may be omitted and wires 218 and 212 may be respectively connected directly to wires 52 and 51, but the use of limit switches 216 and 213 to control the operation of the sampling and dilution device 15 gives better assurance of the proper working registration of the containers 31 with the intake-discharge conduit 84 of device 15.

In operation, the energization of wire 51 (by the above-mentioned "even" binary signal) causes operation of sample feed device 11, solvent feed device 12 and agitator device 13, as above described. Simultaneously, the transfer and filter device 14 is operated to deliver solution from the next-in-advance container 19 (spaced ahead two conveyor steps) to the discharge conduit 83 located over a receiving container 31 on belt 30. Also at this time readout extraction device 16 is energized and limit switch 213 is closed to apply an "even" binary signal to wire 212.

The subsequent "odd" binary signal applied to wire 218 by the next closure of switch 216 at the next conveyor step energizes valve 92, causing fluid pressure to be admitted to cylinder 88 and thereby causing plate 85 to descend. The descent of plate 85 lowers conduit 84 into the liquid in the subjacent container 31 (delivered through discharge conduit 83 one conveyor step previously) and closes limit switch 221. This energizes relay 210, by the circuit above described, which closes its contacts 232–233, 229–230 and 209–211.

The closure of relay contacts 232–233 energizes solenoid 201', causing piston 127 to rise into engagement with stop 129, which draws a measured sample into the conduit 84. Limit switch 217 opens and deenergizes valve 92, which returns to its normal closed position, venting cylinder 88 and allowing plate 85 and assembly 15 to rise to their normal elevated positions by the action of spring 90. Switch 221 opens, but relay 210 is held energized by its closed holding contacts 232–233. Solenoid 201' is likewise held energized, and piston 127 is held in its elevated position.

The next control signal is the "even" binary signal, which is applied to wires 51 and 212, after one further step of the belt conveyors, as above described. Thus, wire 212 receives said "even" binary signal by the closure of switch 213. This energizes solenoid 201 by a circuit comprising wire 48, switch 213, wire 212, relay contacts 209–211, wire 208, switch contacts 206–205, wire 237, solenoid 201, and ground. This causes the dilutor piston 120 to be depressed to its dotted view position in FIGURE 4, at the same time operating valve 122 to interconnect conduits 121, 128 and 84, whereby the sample in tube 84, together with a measured quantity of diluent from burette 119 are discharged into the subjacent container 31.

The descent of arm 234 opens the contacts of switch 207, deenergizing relay 210 at contacts 224–227, deenergizing solenoid 201' at contacts 232–233, and deenergizing solenoid 201 at contacts 205–206. Piston 127 of the sampler burette 126 descends to its normal full-line position shown in FIGURE 4, completing the discharge through conduit 84. The dilutor piston 120 rises to its elevated starting position, shown in full-line view in FIGURE 4 and valves 122 and 200 return to their indicated starting positions, causing burette 119 to be refilled with diluent, thus restoring the parts to their starting positions.

The discharge of the sample and diluent above described is into an empty container 31 spaced one step distance behind that from which the sample was taken. The "even" binary signal on wire 51 is applied to valve 101 of the readout extraction device 16, causing plate 93 and intake conduit 163 to be lowered, as above described, to immerse conduit 163 in the diluted sample. The descent of plate 93 causes switch 239 to close and thereby energizes the readout extraction pump device, whereby a quantity of the diluted sample liquid is drawn from the container 31 and is delivered through the outlet conduit of the extraction device, shown at 179, to the readout device associated with the apparatus.

Wire 51 becomes deenergized at the end of the period of duration of the "even" binary signal (produced by a new closure of the timed switch 49), deenergizing valve 101 and allowing the readout extraction device 16 to rise by the action of spring 99, thereby deenergizing same by the opening of switch 239, and returning it to its starting position.

As above mentioned, the rotary switch 53 may be relied on alone to produce the "even" and "odd" binary signals. Conversely, if so desired, the alternately closed limit switches 213 and 216 may be relied on alone to produce the "even" and "odd" binary signals. Thus, rotary switch 53 may be omitted, and wire 51 may be connected directly to wire 212, as shown in FIGURE 5.

The burettes 119 and 126 may be provided with means for remotely controlling or adjusting their capacities and/or for programming same, as is disclosed in the application of Joseph C. Wasilewski and Horton E. Dorman, Ser. No. 511,465, filed Dec. 3, 1965, and entitled "Fluid Pressure-Operated Burette Systems."

The apparatus herein described is especially advantageous for performing steps in an analytical procedure, such as automatic sequential delivery of a sample, such as a pharmaceutical tablet, soluble in a suitable solvent, or other solid or liquid sample; dissolution of the sample using rapid stirring or ultrasonic disintegration, filtering of the resultant solution, precise volume measurement and removal of an aliquot of the filtered solution, and automatic dilution of the filtered solution with a preselected volume of solvent solution and delivery of the filtered sample solution and solvent to a beaker, followed by suction of the solution through a flow cell in an ultraviolet-visible range spectrophotometer whose wavelength is remotely and automatically preset. The wavelength setting for each sample series is chosen to correspond to the most sensitive measurement of absorbance change of the resulting solution due to quantity of active chemical in the original tablet or sample.

The concentration of active chemical ingredient is related to the photomutliplier current measurement in a spectrophotometer (transmisison) as follows:

$$c = -\log T/ab$$

where $c$ is the concentration, $T$ is the transmission of the solution, $a$ is the molar absorptivity of the solution, and $b$ is the path length of the cell.

By using a recorder which converts the photomultiplier current to a logarithmic readout, there is thus provided a recorder response linearly related to the concentration of active chemical in the original sample.

The above steps are performed in a regular sequence which is continuously repeated with successive like amounts of the sample (for a given program) with precise repetitive regularity.

Since the respective actuators 63, 74 and 98 for effecting vertical movement of the agitator 13, the transfer-filter device 14 and the readout extraction device 16 are simultaneously operated by the "even" pulse applied to line 51, these actuators may be combined, if so desired, into a single actuator unit wherein the elements 13, 14 and 16 are carried on a common support 60' which is vertically reciprocated by a common fluid pressure-operated cylinder 61' controlled by a solenoid valve 62' similar to either of valves 66 or 101, as diagrammatically shown in FIGURE 6.

While certain specific embodiments of an improved automatic analytical apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An analytical apparatus comprising endless belt conveyor means, spaced containers secured on said belt conveyor means, means to drive said belt conveyor means, sample feed means having sample discharge means located over a first container on the belt conveyor means, reagent supply means having reagent discharge means located over said first container, readout extraction means having intake conduit means receivable in another container on said belt conveyor means for extracting treated sample material for testing, waste-receiving means subjacent an end of the belt conveyor means, container cleaning means mounted beneath the belt conveyor means for cleansing inverted emptied containers as they pass along the bottom of the belt conveyor means, solution-extracting means mounted over the belt conveyor means and having an intake conduit engageable in a further container spaced ahead of said first container in the direction of movement of the containers, means to pressurize said further container when said last-named intake conduit is engaged therein, filter means, a discharge conduit located so as to empty into a container spaced ahead of said last-named intake conduit in the direction of movement of the containers, and conduit means connecting the output of said solution-extracting means to said last-named discharge conduit through said filter means, the intake conduit of the readout extraction means being located to receive sample material after it has passed through said filter means.

2. The analytical apparatus of claim 1, and container-drying means beneath the belt conveyor means spaced ahead of the container cleaning means in the direction of movement of the containers along the bottom of the belt conveyor means.

3. The analytical apparatus of claim 1, and means to operate the drive means in steps corresponding to the spacing between the containers on the belt conveyor means.

4. The analytical apparatus of claim 1, and agitator means mounted over the belt conveyor means and being engageable in said first container.

5. The analytical apparatus of claim 1, and means to operate the drive means in steps corresponding to the spacing between the containers on the belt conveyor means, the intake conduit of the solution-extracting means being located at least two steps ahead of said first container.

6. The analytical apparatus of claim 5, and wherein said belt conveyor means comprises a first belt conveyor portion having active containers spaced apart by two steps and a second belt conveyor portion having active containers spaced apart by one step, the sample discharge means and reagent discharge means being located to deliver material to the containers of said first conveyor portion and the intake conduit means of the readout extraction means being located to extract material from the containers of the second conveyor portion, said solution-extracting means being located to extract material from containers of said first conveyor portion, and said discharge conduit being located so as to empty into a container of said second conveyor portion.

7. The analytical apparatus of claim 6, and means located between said discharge conduit and the intake conduit means of the readout extraction means to add further reagent to the material transferred to the containers of said second conveyor portion.

8. The analytical apparatus of claim 7, and means coupling said first and second belt conveyor portions for simultaneous movement in opposite directions.

9. The analytical apparatus of claim 8, and wherein said first and second belt conveyor portions are arranged in parallel relationship.

References Cited

UNITED STATES PATENTS

| | | | |
|---|---|---|---|
| 3,192,968 | 7/1965 | Baruch et al. | 23—259 XR |
| 3,192,969 | 7/1965 | Baruch et al. | 23—259 XR |
| 3,193,359 | 7/1965 | Baruch et al. | 23—253 XR |

MORRIS O. WOLK, Primary Examiner

R. E. SERWIN, Assistant Examiner

U.S. Cl. X.R.

23—259; 141—130